United States Patent
Tunkelang et al.

(10) Patent No.: US 12,124,522 B2
(45) Date of Patent: Oct. 22, 2024

(54) SEARCH RESULT IDENTIFICATION USING VECTOR AGGREGATION

(71) Applicant: eBay Inc., San Jose, CA (US)

(72) Inventors: Daniel Tunkelang, Mountain View, CA (US); Aritra Mandal, Campbell, CA (US); Zhe Wu, Mountain View, CA (US)

(73) Assignee: eBay Inc., San Jose, CA (US)

( * ) Notice: Subject to any disclaimer, the term of this patent is extended or adjusted under 35 U.S.C. 154(b) by 214 days.

(21) Appl. No.: 17/646,695

(22) Filed: Dec. 31, 2021

(65) Prior Publication Data

US 2023/0214432 A1 Jul. 6, 2023

(51) Int. Cl.
*G06F 16/9532* (2019.01)
*G06F 16/9535* (2019.01)
*G06Q 30/0601* (2023.01)

(52) U.S. Cl.
CPC ...... *G06F 16/9532* (2019.01); *G06F 16/9535* (2019.01); *G06Q 30/0625* (2013.01)

(58) Field of Classification Search
CPC .................. G06F 16/9532; G06F 16/9535
See application file for complete search history.

(56) References Cited

U.S. PATENT DOCUMENTS

| | | | |
|---|---|---|---|
| 7,283,997 B1 * | 10/2007 | Howard, Jr. ........ | G06F 16/9535 707/999.005 |
| 9,098,569 B1 * | 8/2015 | Bhagat ................ | G06F 16/9535 |
| 2015/0088898 A1 * | 3/2015 | Branch ................. | G06F 16/245 707/756 |
| 2017/0177712 A1 * | 6/2017 | Kopru ................. | G06F 16/3337 |
| 2018/0052908 A1 * | 2/2018 | Liu ....................... | G06F 16/316 |

OTHER PUBLICATIONS

"How to Calculate the Variance of Vectors for Clustering?," Stack Exchange, 2012, <https://stats.stackexchange.com/questions/34390/how-to-calculate-the-variance-of-vectors-for-clustering>, 2 pages.

(Continued)

*Primary Examiner* — Kannan Shanmugasundaram
(74) *Attorney, Agent, or Firm* — Shook, Hardy & Bacon L.L.P.

(57) ABSTRACT

Search queries are received and search results are provided. Interaction tracking is used to determine with which search results users interact. The search results having received interactions can be represented as item vectors, which can include a vector representation of a portion of the search result, such as a title, description, or image. For each search query, the item vectors are aggregated, such as by averaging the item vectors. The search queries are stored in an item dataset as collected search queries respectively associated with the aggregate item vectors. When a new search query is received, a search query vector can be compared to the aggregate item description vectors to identify collected search queries that are related. The related collected search queries can be provided as search query recommendations or search results associated with the collected search queries can be provided in response to receiving the new search query.

15 Claims, 8 Drawing Sheets

(56) References Cited

OTHER PUBLICATIONS

Steinberg, Eugene, "Semantic Vector Search: the New Frontier in Product Discovery," Grid Dynamics, Jan. 2020, <https://blog.griddynamics.com/semantic-vector-search-the-new-frontier-in-product-discovery/>, 10 pages.

Stathoulopoulos, Kostas, "How to Build a Semantic Search Engine with Transformers and Faiss," Towards Data Science, Nov. 2020, <https://towardsdatascience.com/how-to-build-a-semantic-search-engine-with-transformers-and-faiss-dcbea307a0e8>, 12 pages.

\* cited by examiner

SEARCH RESULT IDENTIFICATION USING VECTOR AGGREGATION

BACKGROUND

Search engines are used to identify and return relevant webpages accessible through the Internet. Search engines employ methods of query understanding to identify the meaning of a search query in an effort to identify and return the most relevant search results. In many cases, one search query can express multiple intents. On the other hand, two different search queries can have an equivalent intent. Identifying the intent of the search query is important for search engines.

SUMMARY

At a high level, aspects described herein relate to providing search query recommendations and identifying search results using aggregate item description vectors for a better understating of search query intent.

When users enter search queries at a search engine, search query recommendations or search results can be provided based on a related search query. That is, a related search query can be determined that more accurately reflects the user intent of the received search query, thus providing better search query recommendations or a way to better identify search results more closely aligned with the user intent of the received search query.

To do so, search queries are received. These search queries are stored in a database as collected search queries. When users receive search results for the collected search queries, users interact with some of the search results. These interactions can be identified through interaction tracking. Thus, collected search queries can be associated with search results with which users have interacted. Collected search queries can also include other received or generated search queries, such as those received from a log of search queries at a search engine, or generated directly from potential search results, such as generating a search query from a title of a webpage that can then be identified when executing the search query at a search engine.

The search results with which users have interacted can be represented in the vector space as item description vectors, which comprise vector representations of a portion of each search result, such as a title, image, description, or the like. As a result, based on the interaction tracking, each of the collected search queries is associated with one or more item description vectors corresponding to the search results with which users have interacted.

The item description vectors for each respective collected search query can be aggregated. This can include averaging the item description vectors. Aggregating the item description vectors generates aggregate item description vectors, which are each respectively associated with the collected search queries.

At runtime, a search query is received. The search query can be matched to a collected search query. A search query vector can then be identified for the search query by using the aggregate item description vector for the matching collected search query. In another case, the search query vector is predicted, e.g., "inferred," using a neural network having been trained on aggregate item description vectors and associated collected search queries.

The search query vector can be compared to aggregate item description vectors in the dataset. For instance, a distance measurement can be used for the comparison. Other methods for performing the comparison include clustering and nearest neighbor algorithms. Based on the comparison, aggregate item description vectors are identified for the search query vector. The identified aggregate item description vectors are associated with collected search queries that are related to the received search query. These related collected search queries can be returned as search query recommendations. In another case, search results associated with the related collected search queries are returned for the received search query. As noted, the identified related collected search queries may better represent the intent of a user that is associated with the received search query.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
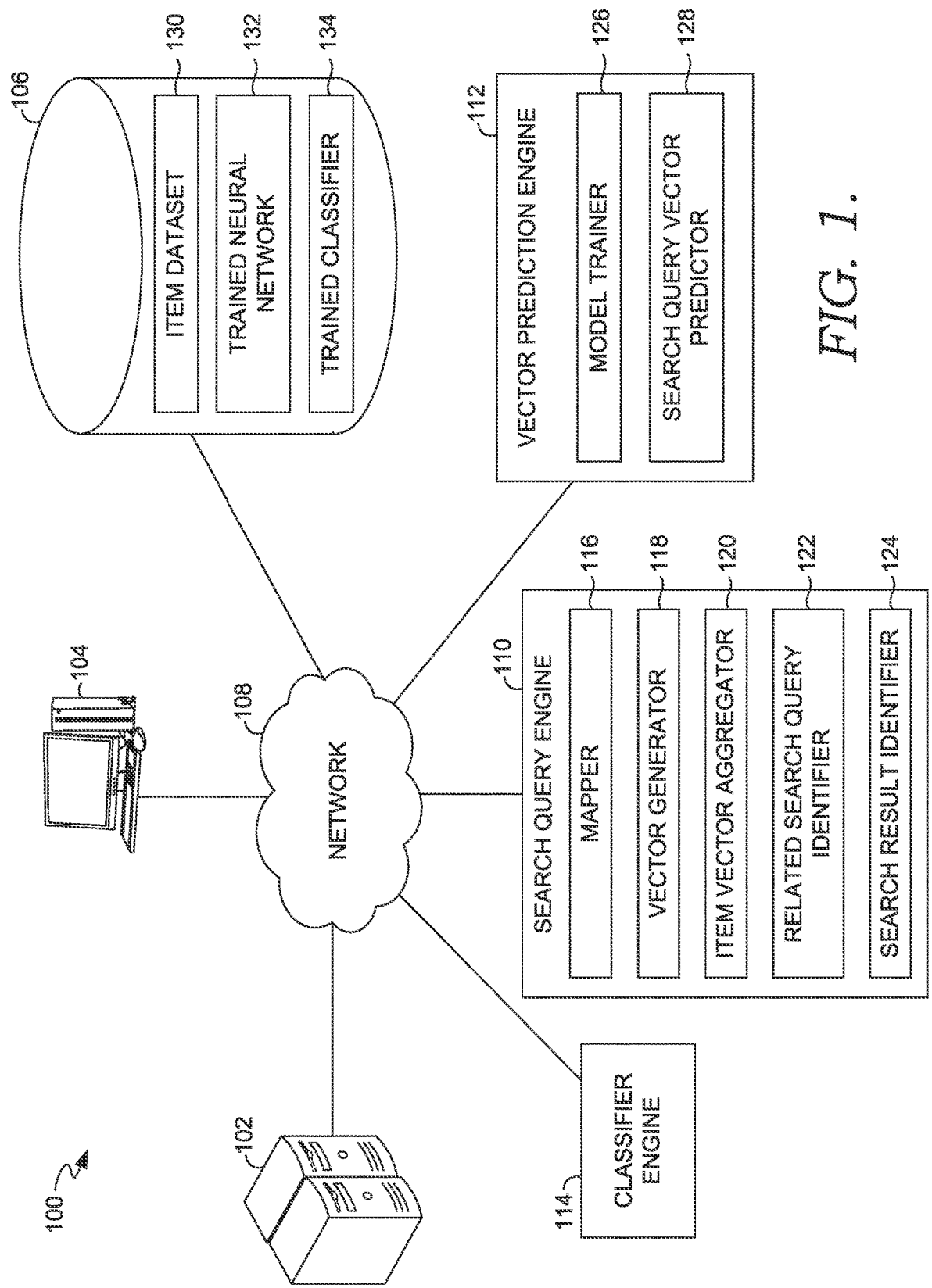
FIG. 1 is an example operating environment in which the technology can be employed, in accordance with an aspect described herein.

In search and retrieval technology, there can be multiple ways for searchers to express a given search intent. Two queries expressing equivalent intent may vary superficially, differing only in word inflection, word order, compounding, or the inclusion of noise words (e.g., men's backpack=backpacks for men). Sometimes, however, the variation between equivalent queries is not immediately evident from surface query features (e.g., iphone headphone jack adapter=lightning to 3.5 mm). Recognizing when two queries express equivalent intent makes it possible to improve search result identification and recall outcomes in various ways. If a search engine retrieves different results for the two queries or ranks results in a different order, then the search engine can choose the retrieval and ranking strategy that leads to a better recall outcome. In other words, it can better identify and recall search results that are more closely related to the actual intent of the search query, thus allowing effective navigation of the Internet. In terms of implementation, this can be done by mapping the lower-performing query to the higher-performing query that expresses equivalent intent, and the retrieving search results for the higher-performing query.

There is also value in recognizing when two queries express similar but not necessarily equivalent intent. The search engine can leverage this similarity to increase recall without unduly decreasing precision. This increase in recall can again lead to better identification and retrieval outcomes. This strategy is particularly useful in the context of queries that return no or few results. In these cases, a recovery strategy aims to increase recall at a small loss of precision.

Sometimes query similarity is evident from surface features of the queries. These surface variations can include: (1) Word inflection. The most common case of variation in word inflection is using the singular and plural forms of nouns (e.g., birkenstock=birkenstocks). Queries can be canonicalized by applying stemming or lemmatization to queries. (2) Word order. Queries may use the same words in a different order (e.g., earbuds samsung=samsung earbuds). Queries can be canonicalized by sorting the query tokens in alphabetical (lexicographic) order. (3) Compounding. Queries may vary in compounding or decompounding query tokens (e.g., backpack=back pack). Queries can be canonicalized by removing spaces and other token separators.

While surface similarity is a strong signal of query equivalence, it is not a guarantee that two queries express equivalent intent. Some counterexamples: (1) Word inflection: kiss!=kisses—the singular is mainly associated with the rock band Kiss, while the plural is mainly associated with Hershey's Kisses candy. (2) Word order: shirt dress!=dress shirt—the first is a type of dress, while the second is a type of shirt. (3) Compounding: wildcats!=wild cats—the first refers to various sports teams, while the second refers to animals. (4) Noise words: desk with lamp!=desk lamp—the first is a desk that includes a lamp, while the second is a type of lamp.

Nonetheless, surface similarity is a strong signal of query equivalence. Combining it with a guard rail, such as the observed or predicted result category based on search demand, allows query equivalence to be established with higher confidence.

Moreover, most search queries are short, the majority containing one to three tokens. That makes it difficult to directly obtain a precise representation of intent from the query text using conventional word embedding techniques.

As noted, understanding query intent is essential to the navigation and function of the Internet. The Internet comprises countless data sources from which information can be accessed by a browser. Generally, the exact internet address is not known. That is because Internet addresses are complex due to the myriad of possible connections. Nor are they intuitive, as the complex addresses do not represent the information that may be viewed at the web address.

For these reasons, search engines are essential for Internet navigation, as they identify web addresses and recall information accessible via the web addresses. To be effective, however, search engines need to understand the intent of a search query, since small changes in interpretation can lead to the inability of the search engine to identify and present useful web addresses.

To provide a simplified example, at the time of drafting this application, the search query "shingles" was entered into a commonly used Internet search engine. The search engine identified about 175,000,000 search results. The term "shingles," however, can have different meanings when used in different contexts. For instance, the intent of the search query may have been related to the viral infection that causes painful rashes, or the intent might have been to identify options for home roofing. Due to the large number of possible search results, if the search engine incorrectly identifies the intent as a viral infection, while the true intent is home roofing options, then the search results for home roofing options are ranked so far down into the 175,000,000 possible search results that items related to the true intent are effectively not identifiable by a user using the search engine. Put another way, for any given search query, even one as simple as this example, there are generally so many possible search results that any small error in identifying the true intent can lead to the inability to properly navigate the Internet.

Conventional methods seek to solve this problem by employing methods of query understanding and intent determination. In some cases, a search engine will identify search results related to different meanings and present a mixture of results to a user. This tends to reduce the number of items related to the true intent that are viewable for a user, since some of the search results will necessarily include an intent the user did not have. Other query understanding methods use query expansion to identify search results for queries with related words, e.g., trying to capture intent through providing search results for related words. While useful, such methods increase the number of possible search results, and as such, can compound the problem if the actual intent is never identified.

To solve these problems, the disclosed technology leverages query mapping to item listings in the vector space. The mapping can be done based on interaction tracking for collected search queries. That is, once a search query is received, a user may interact with particular search results, and these can be tracked. Thus, the mapping between these collected search queries and search results with which users interact presents a learning opportunity to identify the actual intent of the search query. Further enhancements to the learning can come from aggregating vector representations of descriptions for search results. That is, the search results with which a user has interacted comprise descriptions, and these descriptions can be represented as vectors. The vectors for the descriptions can be aggregated, for instance, by averaging the vectors. This aggregate vector is associated with the search query, and can be used for identification and recall.

Such methods improve the ability to understand query intent, and therefore, provide better search query recommendations and search results, and improve the ability to navigate the Internet using a search engine. In part, this is a result of the better machine learning that can be performed using the aggregate vectors.

In addition to improving the ability of a search engine to identify and recall search results, the technology also improves the computer system operating on the network on which the search is conducted. For instance, the ability to learn from search queries provides an opportunity to generate a database of collected search queries and their associated aggregate item description vectors determined based on the interaction tracking, or otherwise received or generated. Using this, a received search query can be matched to a collected search query. Using different learning techniques, such as nearest neighbor analyses and clustering algorithms, related collected search queries can be identified, and the search results associated with these identified related collected search queries can be provided.

This process is computationally less intensive than conventional methods that identify search queries through query expansion, as query expansion methods increase the number of search queries for which search results are retrieved. The database management methods provided herein are relatively less computationally intensive, allowing processing power of the computer to be diverted to other activities. In this sense, the computer can perform more activities while using the described methods, relative to processing the conventional methods, thus improving the computer's capabilities. In some cases, more limited computer technology, such as smaller computers with less processing power, can efficiently employ the technology for database search and recall.

One example method that can be implemented from the description herein, which achieves the benefits described in this application, among other benefits, is a computerized method that aggregates item vectors for use in providing search query recommendations and search results. For instance, when users enter search queries at a search engine, search results are returned for the search queries. Interaction tracking is used to determine search results with which the users interact. The search results having received user interactions are mapped to the search queries. The search queries can be stored as collected search queries mapped to the item listings having received some interaction from a user.

Item vectors are determined for each of the search results stored in the database and associated with the collected search queries. Item vectors can be generated based on a portion of information associated with each of the search results, including any text or image forming part of the search result or accessible at a webpage or link associated with the search result. Thus, each collected search query is associated with item vectors representing the search results mapped to the collected search queries.

The item vectors associated with each collected search query can be aggregated to generate an aggregate item description vector. This can be done by averaging each of the item vectors associated with each collected search query. At this point, each collected search query is associated with an aggregate item description vector. This association can be stored in an item dataset, which can be leveraged to provide search result recommendations or search results, and which can serve as training data for further learning.

To further learn from the item dataset, the item dataset can be stored as a nearest neighbor dataset, which indicates the relative distance between aggregate item description vectors stored in the item dataset. Another learning method includes applying a clustering algorithm to the dataset to identify item aggregate item description vector clusters, which indicate groups of one or more aggregate item description vectors geometrically related in the vector space. Each of these methods may provide a relative indication of a search intent based on the relation between search queries identifiable using the geometric relationship between the aggregate item description vectors.

In use, the item database can provide search query recommendations or search results, among other applications. For instance, when a search query is received, the search query can be matched to a collected search query in the item dataset. Using the nearest neighbor, as determined by a cosine similarity, or an aggregate item description vector cluster, related search queries can be identified from other collected search queries. The related search query (also referred to as "related collected search queries") can be offered as a search recommendation or the search results of the related search query can be provided as a response to the received search query, among other applications.

In a particular case, a related collected search query is selected based on its relation to the matching collected search query in addition to the past performance of the related search query, such as a past interaction performance. In this way, related collected search queries that have historically had a higher performance relative to the received search query can be identified and provided as a recommendation or used as the basis of a search to identify search results to provide in response to the received search query.

Yet another learning technique that may be employed using the item dataset provides for using the item dataset as training data for training a neural network. A neural network can be trained on the item dataset so that the trained neural network is configured to receive a search query input and output a predicted, i.e., "inferred," search query vector. This is particularly beneficial in situations where a search query is received and there is no matching collected search query. For instance, the neural network can be employed to identify a search query vector for the search query, and the search query vector can be used to identify a related collected search query from among the collected search queries of the item dataset by comparing the search query vector to the aggregate item description vectors, for example, using a distance measurement, nearest neighbor algorithm, clustering method, or the like. The related collected search query can be similarly treated in that it can be provided as a recommendation or the search results associated with the related search query can be identified and provided in response to the received search query.

Some methods of the technology further employ a classifier to predict an item classification for a search query as another way to enhance the identification of the related collected search query. That is, a classifier configured to receive a search query input and predict a classification can be employed for the item dataset to predict a classification for each of the collected search queries. Other methods of classification identification can be used. A classification vector can then be concatenated to the aggregate item description vector, and the item dataset can be provided as training data to train the neural network. In implementation, a search query is received and the classifier is used to predict a classification for the search query. A classification vector can be concatenated to the search query vector and provided as an input to the trained machine learning model. In some cases, the accuracy and precision of identifying the related search queries is increased due to the additional classification information.

Throughout this disclosure, some aspects of the technology are described in the context of ecommerce items. However, it will be understood that the invention is not limited to this context alone, as it is more generally applicable to most Internet search engines. As such, it is intended that some language should be broadly interpreted. For instance, where the application describes items listings on an item listing database, it is intended that this also include other possible search results, such as webpages and the like, which may be entirely unrelated to an "item" for sale on a website. In the same spirit, an "item description" is to be broadly interpreted to include any description for a search result, such as text or images provided at a webpage associated with the search result. Accordingly, terms such as "item listing database" can encompass a database of any potential search results, and once again, is not intended to limit the technology to implantations related to items for sale.

It will be realized that the methods previously described are only examples that can be practiced from the description that follows, and they are provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 includes server 102, client device 104, and datastore 106. Each of which is illustrated communicating across network 108.

Generally, server 102 is a computing device that implements functional aspects of operating environment 100 to facilitate providing search results for a search query. One suitable example of a computing device that can be employed as server 102 is described as computing device 800 with respect to FIG. 8. In implementations, server 102 represents a back-end or server-side device. Server 102 may receive a search query from client device 104, and identify search results for the search query, which server 102 may provide to client device 104 in response to receiving the search query.

Client device 104 is generally a computing device that can receive a search query from a user and provide the search query to server 102 for identification of search results. Client device 104 may present the search results, or other information, to the user. One suitable example of a computing device that can be employed as client device 104 is described as computing device 800 with respect to FIG. 8. In implementations, client device 104 is a client-side or front-end device. In addition to server 102, client device 104 may implement functional aspects of operating environment 100 to provide search results or other information to a user. It will be understood that some implementations of the technology will comprise either a client-side or front-end computing device, a back-end or server-side computing device, or both executing any combination of functions, some examples of which will be further described, to identify and provide search results, or other information, to a user.

Network 108 may include one or more networks (e.g., public network or virtual private network "VPN") as shown with network 108. Network 108 may include, without limitation, one or more local area networks (LANs) wide area networks (WANs), or any other communication network or method.

Datastore 106 generally stores information including data, computer instructions (e.g., software program instructions, routines, or services), or models used in embodiments of the described technologies. Although depicted as a single database component, data store 106 may be embodied as one or more data stores or may be in the cloud.

To identify search results, components of operating environment 100 may employ search query engine 110, vector prediction engine 112, and classifier engine 114. Search query engine 110, vector prediction engine 112, and classifier engine 114 may include computer-readable instructions, and may be stored within database 106 for use by components of operating environment 100.

Having identified various components of operating environment 100, it is again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of the previously listed components. Other arrangements and elements (e.g., machines, interfaces, functions, orders, and groupings of functions, etc.) can be used in addition to or instead of those shown, and some elements may be omitted altogether.

Further, many of the elements described in relation to FIG. 1, for instance, those described in relation to search query engine 110, vector prediction engine 112, and classifier engine 114, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, the functions described in relation to FIG. 1 may be performed by server 102, client device 104, on a combination of both.

To identify and return search results, client device 104 may receive a search query at a search engine. A search query can be provided in any form, including text, images, or the like. Client device 104 may provide the search query to server 102 to identify search results, which can be provided back to client computing device 104 for presentation at a user interface. In some cases, server 102 can identify a recommended search query and provide the recommended search query to client computing device 104.

As part of identifying search results or providing a search result recommendation, server 102 can employ search query engine 110. In general, search query engine 110 identifies a search query that is related to the search query received from client computing device 104. The related search query can then be used to identify search results for the received search query. In many cases, this is beneficial because the related search query may better indicate a user intent. The related search query may be determined and identified based on a better performance of the related search query relative to the received search query, and as such, search results for the related search query can be provided in lieu of or in addition to search results for the received search query. Among other applications, the technology can be used for query expansion, as well as identifying better search results for a search query.

In doing so, search query engine 110 may employ mapper 116, vector generator 118, item vector aggregator 120, related search query identifier 122, and search result identifier 124.

In general, mapper 116 maps search queries to a subset search results with which users have interacted. Methods of interaction tracking are generally known in the art. This may include tracking user clicks of search results, tracking purchase history, tracking navigation via search result links, tracking items added to an ecommerce cart, tracking social media shares, and so on. Upon determining user interactions with the search results, the search query can be mapped to the search results having received some interaction as determined by the interaction tracking. This mapping can be stored as a dataset to identify associations between search queries and search results that have received an interaction. The search queries mapped by mapper 116 can be stored as collected search queries and stored in association with the search results having received user interactions. In aspects of the technology, collected search queries may broadly include any received or generated search query, including those received at (or from) search engines, or search queries generated using potential search results. (For instance, an item title of an item listing on an item listing database can be used to generate a search query for inclusion in collected search queries.) In some cases, it can be beneficial to identify a ranking of search results having received user interactions, where higher ranked search results have received a relatively higher number of user interactions. By doing this, a top number of highest ranked search results can be identified and used for the generation of item vectors, as will be further described.

In some aspects, mapper 116 maps search queries to a subset of search results. That is, a search engine can be used to execute a search query. In response, the search engine returns search results. Mapper 116 can select a subset of the search results for mapping to the search query. For instance, mapper 116 may select a top number of ranked search results and map the top number to the search query. As an example, this can include the top 10, 25, 50, or 100 search results identified for a search query. In another example, the top number is equal to or less than 100 search results. In some cases, mapper 116 maps a search query to a number of search results corresponding to a first page of search results provided by a search engine. The search queries mapped to the search results by mapper 116 can be stored as collected search queries.

Figure 2:
FIG. 2 is an example interface having a search query and an example mapping determined by interaction tracking of the search query, which can be performed by components of FIG. 1, in accordance with an aspect described herein.

FIG. 2 illustrates an example interaction tracking and mapping that can be performed by mapper 116. An example interface 200 is provided illustrating search query 202 entered at a search engine. In response to receiving search query 202, search results 204 are provided. Interaction tracking can be used to determine with which search results users are interacting. As illustrated in the example of FIG. 2, mapping 206 shows the results of the interaction tracking. In particular, users entering search query 202 for "Bean Bag" interacted with search results for "small bean bag chair for kids" 15% of the time, "5 ft chill sack" 20% of the time, "foam micropellet sitting pad" 25% percent of the time, and "travel neck pillow" 37% of the time. It will be understood that this is a simplified example to help illustrate the technology being described. This is just one example of how a search query, such as search query 202, can be mapped by mapper 116 to search results having received interactions from users as identified using the interaction tracking.

Search query engine 110 may employ vector generator 118 to generate vectors for descriptions, e.g., item descriptions, of the search results mapped to the historic search queries. Search results may comprise "items," which is broadly the information associated with the search results, including text, images, and the like. For instance, a search result may be associated with a webpage, and the webpage generally includes text or images that are considered "items." A search engine generally identifies search results comprising items that are related to the initial search query. In a specific example, a search engine for an online marketplace can identify search results in the form of item listings, which can include items offered for sale on the online marketplace. In this sense, an "item description" can include any portion of information describing the item. For instance, a wiki page about "Mount Doom" can comprise a title, an image, an abstract, a discussion, and so on describing the item. Any portion of the webpage, e.g., the title, image, abstract, discussion, can be an "item description." In a particular context, the item description is a piece of labeled structured data for an item. For instance, an item listing on an item listing database of an online marketplace comprises a title of the item, a description of the item, an image of the item, and so on. The title, description, image, etc. can be referred to as the item description. In one suitable use case of the technology, the title of an item listing has been identified as particularly useful as the item description when implementing the described technology.

As noted, vector generator 118 can be used to generate item vectors for item descriptions of the search results mapped to the historic search queries. That is, vector generator 118 generates a vector representation of an item description, including a vector representation of a text or image of the item description. Vector generator 118 can use methods such as Word2Vec, fastText, BERT, and the like to generate an item vector. Vector generator 118 can generate item vectors for each of the search results that is mapped to each historic search result. As such, each of the historic search queries of the dataset is associated with item vector representations of the search results with which users have interacted.

Figure 3A:
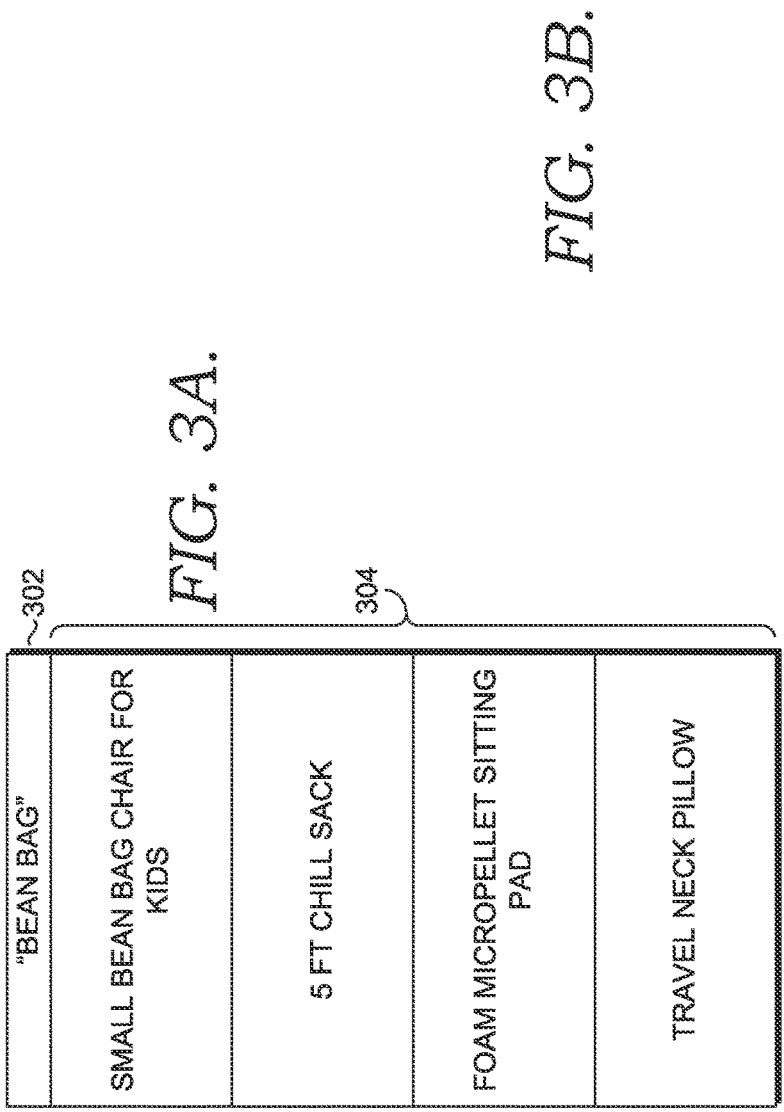
FIGS. 3A-3C illustrate an example mapping and vector aggregation performable by components of FIG. 1, in accordance with aspects described herein.
Figure 3B:
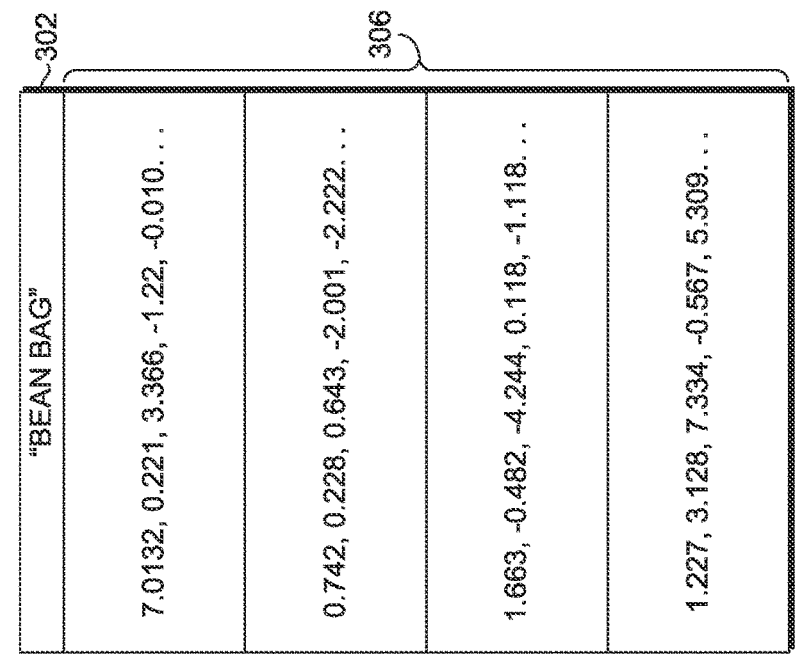

FIGS. 3A-3B provide an example illustration of employing vector generator 118 to generate item vectors for item descriptions associated with search results of a historic search query. For instance, FIG. 3A illustrates mapping 300 that comprises collected search query 302 for "Bean Bag." Collected search query 302 corresponds to search query 202 of FIG. 2 that has been mapped to search results having received interactions as identified through the interaction tracking. Item descriptions 304 correspond to the search results having been interacted with by users, as illustrated in mapping 206 of FIG. 2. Item descriptions 304, in this example, include the item title for each item description of the mapped search results. Vector generator 118 is applied to item descriptions 304 to generate item description vectors 306 illustrated in FIG. 3B.

Item vector aggregator 120 generally generates aggregate item description vectors from the item vectors generated by vector generator 118. The aggregation of the item vectors may sometimes be referred to in the art as "vector pooling." Generally, aggregating item vectors generates a single vector representation of multiple item vectors. Thus, the item vectors can be "aggregated" into a single vector that is representative of the item vectors being aggregated.

One method of vector aggregation that can be employed by vector aggregator 120 includes averaging. That is, the item vectors comprise values that numerically represent a position in a multidimensional space relative to other item vectors. These values can be averaged to provide an averaged aggregate item description vector that comprises values representative of the average of the item vectors. Another vector aggregation method includes a weighted average. For instance, search results having a relatively greater number of interactions can be weighted more than search results that have relatively few interactions.

Turning back to FIG. 2, as an example, the search result for "Travel Neck Pillow" received 37% of user interactions, while the "5 ft Chill Sack" received 20%. Thus, when averaging item vector representations for these search results, the item vectors can be weighted proportional to the number of interactions each search result has received relative to other search results with which users have interacted. These are some examples of how a collected search query can be associated with an aggregate item description vector that geometrically represents an average of the item vectors for search results with which users have interacted.

Figure 3C:
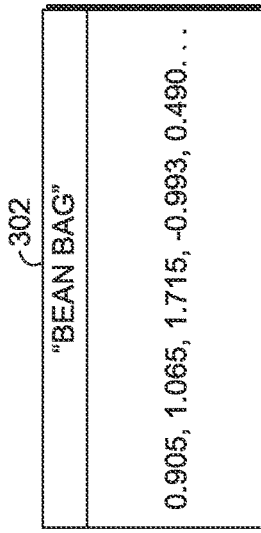

To provide an example illustration, FIG. 3B comprises collected search query 302, which is associated with item vectors 306 determined from item descriptions 304. Item vector aggregator 120 can be applied to aggregate item vectors 306 into aggregate item description vector 308, illustrated in FIG. 3C. Here, collected search query 302 is now associated with aggregate item description vector 308.

Collected search queries and their associated aggregate item description vectors can be stored within item dataset 130, illustrated in database 106 of FIG. 1. As will be further discussed, item dataset 130 comprising the collected search queries and associated aggregate item description vectors can be used for, among other things, search query recommendation, search result identification, and as training data for other machine learning processes.

For instance, related search query identifier 122 can identify a search query from item dataset 130 that is related to a received search query. That is, a search query can be received from client computing device 104. Related search query identifier 122 can identify a search query related to the received search query using the aggregate item description vectors stored within item dataset 130. The related search query can be provided as a search query recommendation in response to the received search query. In some cases, the search results associated with the related search query can be provided as search results for the received search query. This provides one mechanism to better understand user intent. For instance, where the user intent might be best represented by a different, but related, search query, the related search query can be provided as a search query recommendation for execution at the search engine, or search results associated with the related search query are returned as search results for the received search query, where the search results for the related search query better represent the user intent of the received search query.

Thus, continuing with a previous example, if the user inputs "shingles" as the search query, but the related search query "herpes zoster" returns search results more closely aligned with the intent of the received search query, then "herpes zoster" might be offered as a search query recommendation, or search results for "herpes zoster" may be returned in lieu of or in addition to those for "shingles." As will be understood, identifying related search queries in manners provided herein, such as those based on aggregate item description vectors, can also aid in query expansion, identifying better performing search queries (e.g., those having received more user interactions associated with their search results), identifying and correcting spelling within search queries, and so on.

Related search query identifier 122 generally identifies a search query related to a received search query. Among other methods, related search query identifier 122 can use machine learning methods, such as a nearest neighbor algorithm, a clustering algorithm, and the like to identify a related search query. Related search query identifier 122 identifies a related search query using a search query vector determined for the search query and the aggregate item description vectors for the collected search query provided in item dataset 130. That is, the search query vector can be compared to the aggregate item description vectors to identify a related search query based on a distance of the search query vector to the aggregate item description vectors of the collected search queries.

To identify a related search query, related search query engine 122 determines the search query vector for the search query. One method of determining the search query vector is to identify a matching collected search query having an associated aggregate item description vector representation, and then employing the associated aggregate item description vector as the search query vector. For instance, a search query engine can use item dataset 130 to determine a search query vector. Here, when the search query is received, the received search query is compared to collected search queries of item dataset 130 to determine if a collected search query matches the received search query. A matching collected search query has with it an associated aggregate item description vector. The aggregate item description vector for the matching collected search query can be used as the search query vector for the received search query.

Another method related search query identifier 122 can use to determine the search query vector comprises using a neural network to predict, or infer, the search query vector. For example, related search query identifier 122 can employ vector prediction engine 112 to predict the search query vector.

In general, vector prediction engine 112 generates a search query vector for a received search query input using trained neural network 132. Model trainer 126 of vector prediction engine 112 can be used to train a machine learning model, such as a neural network, to predict a search query vector for a search query input. Several types of neural networks may be suitable for use with the present technology. For instance, the neural network may be a perceptron or MLP (multilayer perceptron), an ANN (artificial neural network), a radial network, a CNN (convolutional neural network), an RNN (recurrent neural network), an LSTM (long short-term memory) neural network, or the like. One particular example that has been identified as suitable in a method reduced to practice is BERT (Bidirectional Encoder Representations from Transformers).

Model trainer 126 can use item dataset 130 as training data. That is, item dataset 130 comprises the collected search queries associated with aggregate item description vectors. Thus, the aggregate item description vectors can serve as the basis for training a neural network. In this way, model trainer 126 trains a neural network on item dataset 130 as training data to generate a trained neural network configured to receive a search query input and output a prediction of a search query vector. In a specific example, item dataset 130 is used to fine-tune a model, such as BERT, to output a predicted search query vector. As a result of the training, model trainer 126 generates a trained neural network that can be stored in datastore 106 as trained neural network 132 for use by other components of operating environment 100, including related search query identifier 122 of search query engine 110 to facilitate identifying a related collected search query.

When related search query identifier 122 is provided with a received search query, related search query identifier 122 can employ search query vector predictor 128 of vector prediction engine 112 to predict the search query vector. Here, search query vector predictor 128 provides the received search query as an input to trained neural network 132. In some cases, this is done in response to related search query identifier 122 identifying that there is no matching collected search query within item dataset 130 for identifying a search query vector. In response to the search query input, trained neural network 132 outputs a predicted search query vector that can be used by related search query identifier 122 to identify a related collected search query.

In some cases, trained neural network 132 can predict a search query vector based further on a predicted classification of a search query. That is, the trained neural network can be configured through training to receive as an input a search query and a predicted classification of the search query to output a predicted search query vector. A classification can include any known category of information regarding the search query. Using a previous example, if the predicted classification for the search query "shingles" is "medicine" or "health," for example, then the classification along with the search query can be provided to trained neural network 132 to generate the search query. Likewise, the classification could have included "building material," etc. for "shingles." In doing so, the trained neural network may be used to more accurately predict a search query vector for a search query in order to identify related search queries and ultimately better understand the search query intent. Classification prediction is further beneficial when using search engines for websites or other databases that categorize data. In the context of an online marketplace, many items, which can be provided as search results, are associated with particular categories, and thus, predicting a category for a search query and using it as an input to trained neural network 132 is beneficial in identifying related search queries, and ultimately inferring the search query intent.

Some methods of classification prediction known in the art may be suitable for use with the described technology. Classifier engine 114 can be applied to a received search query to predict the classification, e.g., a category, for the search query. In predicting a classification, classifier engine 114 can employ trained classifier 134, where classifier engine 114 provides a search query input to trained classifier 134, which in response, outputs a predicted classification for the search query input. One example method that classifier engine 114 may employ to predict classifications for search queries is described in U.S. application Ser. No. 15/429,564, entitled "Semantic Classification System," issued as U.S. Pat. No. 10,599,701, which is hereby expressly incorporated by reference in its entirety.

Another example method includes training a classifier, such as a neural network, logistic regression model, decision tree model, or the like, using a labeled set of training data comprising terms and labeled classifications for the terms. In the context of an online marketplace, for example, a training set can comprise a corpus of item information on an item listing database, where the items are labeled with item categories. Models such as BERT and the like can be trained or fine-tuned using the labeled training data. These are just examples of how search query classification may be performed by a classifier engine to predict a classification for a received search query. The classifier can be trained and stored as trained classifier 134 for use by other components of operating environment 100.

Classifier engine 114 can be employed to predict classifications for the collected search queries of the item dataset. For instance, each collected search query can be input into classifier engine 114 to predict a classification for the collected search query. Other methods of labeling may also be employed to determine a classification for each of the historic search queries. The associated classifications can also be stored in item dataset 130. In one method, a classification vector is determined, for instance, by using vector generator 118, for the determined classifications. The classification vectors may be concatenated to the aggregate item description vectors of the item dataset. In this example, model trainer 126 trains the neural network using both the aggregate item description vector and the classification vector when generating trained neural network 132, in which case, trained neural network 132 is configured to receive a classification and a search query to predict the search query vector.

To determine a search query vector based also on the classification for a received search query, related search query identifier 122 can employ search query vector predictor 128 of vector prediction engine 112. Related search query identifier 122 can provide both a search query and a predicted classification for the search query to trained neural network 132 to receive as an output the predicted search query vector.

Having determined a search query vector for a received search query, by matching the search query to a collected search query or predicting a search query vector using vector prediction engine 112 or any other method, related search query identifier 122 can use the search query vector to identify collected search queries that are related to the received search query.

One example method that may be employed by related search query identifier 122 uses a distance measurement between the search query vector and the aggregated item description vectors within item dataset 130. Cosine similarity can be used as the distance measurement. In some cases, the aggregate item description vector that has the closest distance to the search query vector based on cosine similarity is identified. The identified aggregate item vector is associated with a collected search query, and thus, the associated collected search query is identified as the related collected search query.

In an aspect, a nearest neighbor algorithm can be employed to identify a nearest neighbor within item dataset 130. That is, item dataset 130 can comprise a nearest neighbor dataset, e.g., using a structured data method to represent the collected search queries and their associated aggregate item description vectors. A nearest neighbor algorithm can be used to process the data to determine its geometric structural relationship. A cosine similarity can be used to determine the nearest neighbor.

In some instances, a threshold distance can be used to identify the aggregated item description vectors within the threshold. In an example, the threshold distance is a cosine value, and can be set at any value, as will be understood by those of ordinary skill in the art. In some cases, the threshold distance value is determined by the variance of item vectors aggregated to form the aggregated item description vectors. That is, a cosine similarity metric can be computed between each of the item vectors aggregated to form an aggregate item description vector. In most cases, the cosine similarity metric between any two vectors will be a value at or between −1.0 and 1.0. Generally, the closer the value is to positive 1.0, the more similarly positioned the vectors are in the vector space. In this way, the cosine similarity can be determined between pairs of item vectors that form the aggregate item vector. From the cosine similarity values for the item vectors associated with a search query, a variance can be determined. The variance can be stored in association with the aggregate item description vector for the search query.

The threshold distance value can then be determined based on the value of the variance. In an aspect, as the variance increases, the threshold distance value can decrease (e.g., lowering a cosine similarity from 0.98 to 0.96) to encompass a greater distance for identifying aggregate item description vectors. This can be beneficial because the higher variance might indicate a higher degree of uncertainty in the relationship of the item vectors aggregated into the aggregate item description vectors. As such, the lower threshold value, with respect to a lower cosine similarity value, provides aggregate item description vectors at a relatively greater distance to be identified within item dataset 130, allowing more potentially related search queries to be identified from the collected search queries, and capturing a wider range of possible search results, as will be described and understood. This can help overcome any issues with high variance in the aggregate item description vectors due to highly varied search results in response to the collected search queries.

Another method that can be used by related search query identifier 122 to identify related search queries includes identifying collected search queries that are in a same cluster as a received search query. Here, a clustering analysis can be performed on the item dataset 130. For instance, clustering methods based on distribution, centroids, closeness of connectivity, density, subspace, and the like may be employed on dataset 130 to identify aggregate item description vector clusters for the aggregate item description vectors.

When search query engine 110 receives a search query, related search query identifier 122 can identify a search query vector, e.g. through matching a collected search query or employing vector prediction engine 112. Related search query identifier 122 can then compare the search query vector to the aggregate item vectors of item dataset 130 to identify an aggregate item description vector cluster. One or more of the collected search queries associated with the aggregate item description vectors within the same cluster can be identified as related to the search query.

As noted, related search queries identified by related search query identifier 122 can be returned to client computing device 104 as recommended search queries. That is, when a user enters a search query, before or after the user executes the search of the search query, search query engine 110 can provide the user, via client computing device 104, with a recommended search query that may better identify the user intent. As will be discussed, the related search query may be used to return search results that better reflect the user intent of the search query.

In some cases, including those using distance measures, nearest neighbors, clustering algorithms, and the like, related search query identifier 122 can identify a related search query from collected search queries based on a performance of the collected search query, where the performance is based on interactions associated with the search results of the collected search query. As discussed, the interactions with search results for collected search queries may include actions such as clicking a search result link, purchasing an item of the search query (i.e., conversion), adding items to a shopping cart, and so forth. These interactions can be tracked using interaction tracking, and a number of interactions received by a total number of search results for a collected search query can be associated with the collected search query in item dataset 130. In some cases, a number of interactions for a top number of highest ranked search results can be determined and associated with the collected search query. In this sense, performance of a search query can be relatively higher where there are more interactions or more interactions with the top highest ranked search results.

Thus, related search query identifier 122 may identify a related search query by selecting a collected search query based on the aggregate item description vector for the collected search query and the performance of the collected search query. For instance, related search query identifier 122 may determine a number of aggregate item description vectors within a threshold distance value from the search query vector, and from the identified number, select an aggregate item description vector having an associated collected search query with a highest performance relative to other collected search queries associated with other aggregate item description vectors having a relatively lower performance, e.g., fewer interactions determined from the interaction tracking. Similarly, related search query identifier 122 may identify one or more aggregate item description vector clusters for the search query vector, and identify related collected search queries from the one or more aggregate item description vector clusters. From the identified related collected search queries, a collected search query having a highest performance can be identified as the related collected search query for the received search query.

Having identified a related collected search query, search result identifier 124 can be used to identify search results for the related collected search query, which may be provided as search results for the received search query. One method of identifying the search results includes executing the related collected search query as a search query at a search engine, and retrieving the results, which can be provided in response to receiving the received search query from client computing device 104.

In an aspect, related collected search queries are provided as search query recommendations. In some cases, a selected search query recommendation may be received from client computing device 104 in response to providing the search query recommendations, and search result identifier 124 may execute a search for the selected search query recommendation to identify and provide search results. Another example method incudes identifying search results associated with the related collected search query that have received interactions. This can include all the search results or a top number of highest ranked search results associated with the related collected search query, and providing these search results in addition to or in lieu of search results for the received search query.

Figure 4:
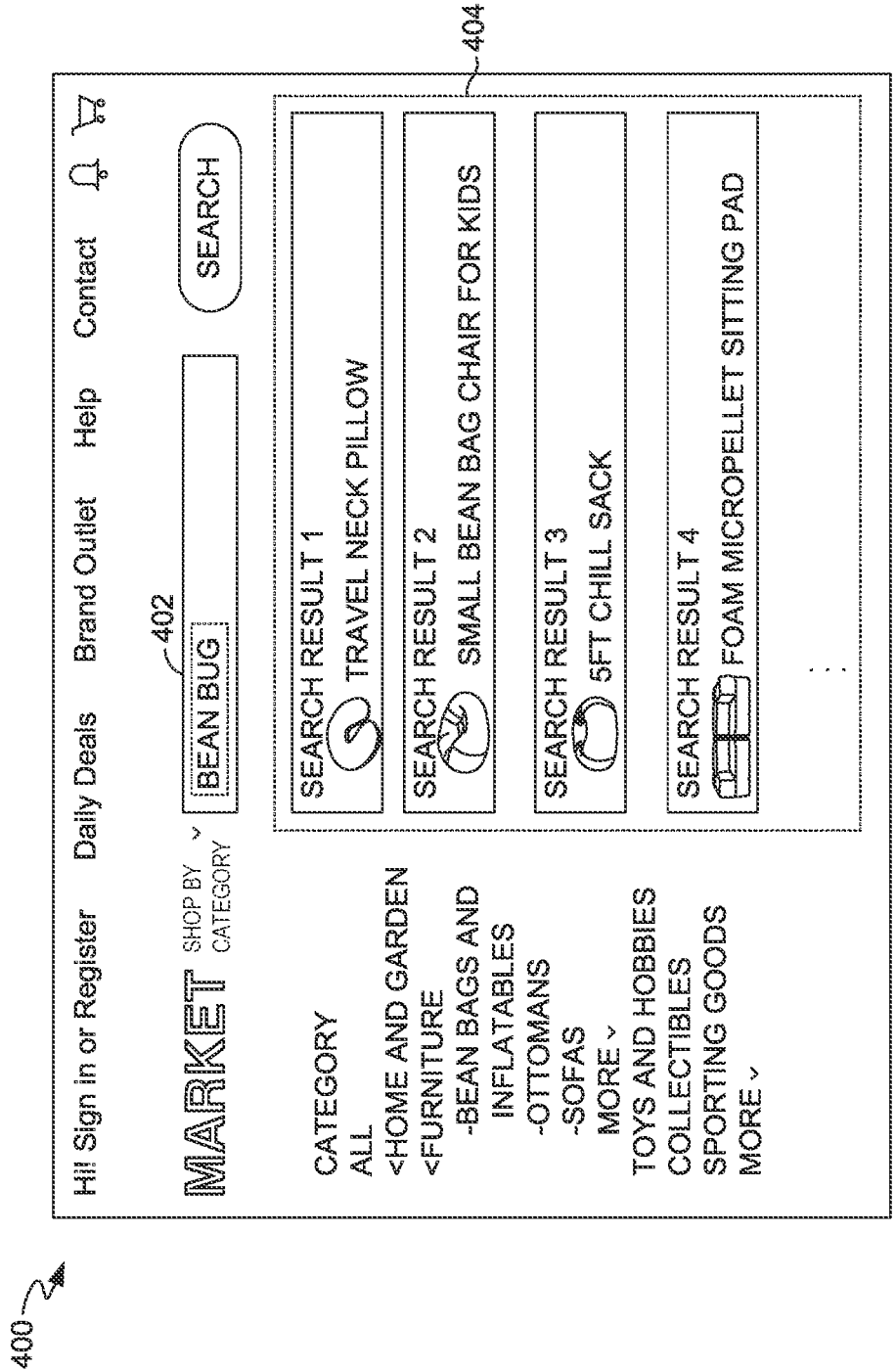
FIG. 4 is another example interface comprising search results for a search query, where the search results can be determined using the components of FIG. 1, in accordance with an aspect described herein.

To provide a continued illustrated example, FIG. 4 depicts example interface 400 comprising search results for search query 402 for "Bean Bug." Here, search query 402 for "Bean Bug" has been received at a search engine. Search query engine 110 of FIG. 1 can be employed to better understand a user intent for search query 402 and return search results 404 that are more related to the user intent. In the example shown, a search query vector for search query 402 can be determined, and using the search query vector, a related search query from among collected search queries can be identified. As an example, related search query identifier 122 of search query engine 110 may have identified "Bean Bag" as a related collected search query from among the collected search queries, which corresponds to search query 202 of FIG. 2.

As previously discussed, search query 202 was associated with search results 204, some of which received interactions by users and were mapped based on interaction tracking. The mapped search results, having received user interactions or otherwise logged, can be identified as associated with the related collected search query and returned as search results 404 for search query 402. This is one example use case in which the present technology can be employed, which has been provided to illustrate an example of the technology. The example is not meant to limit the applications of the technology, but instead, is given as an illustrative aid in understanding the context of the technology and some of its benefits.

Figure 5:
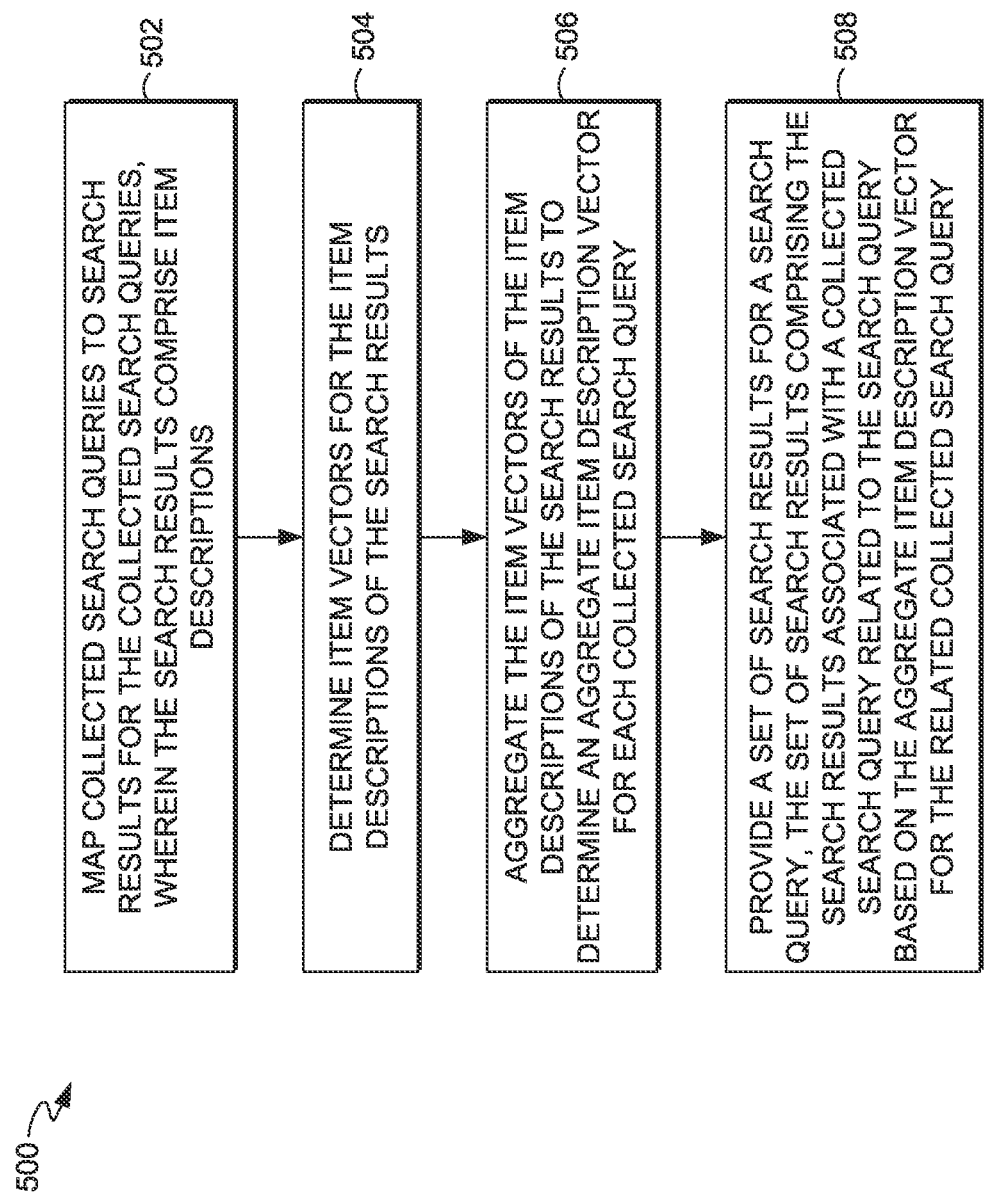
FIGS. 5-7 are example methods for returning search results, which can be performed by components of FIG. 1, in accordance with aspects described herein.
Figure 6:
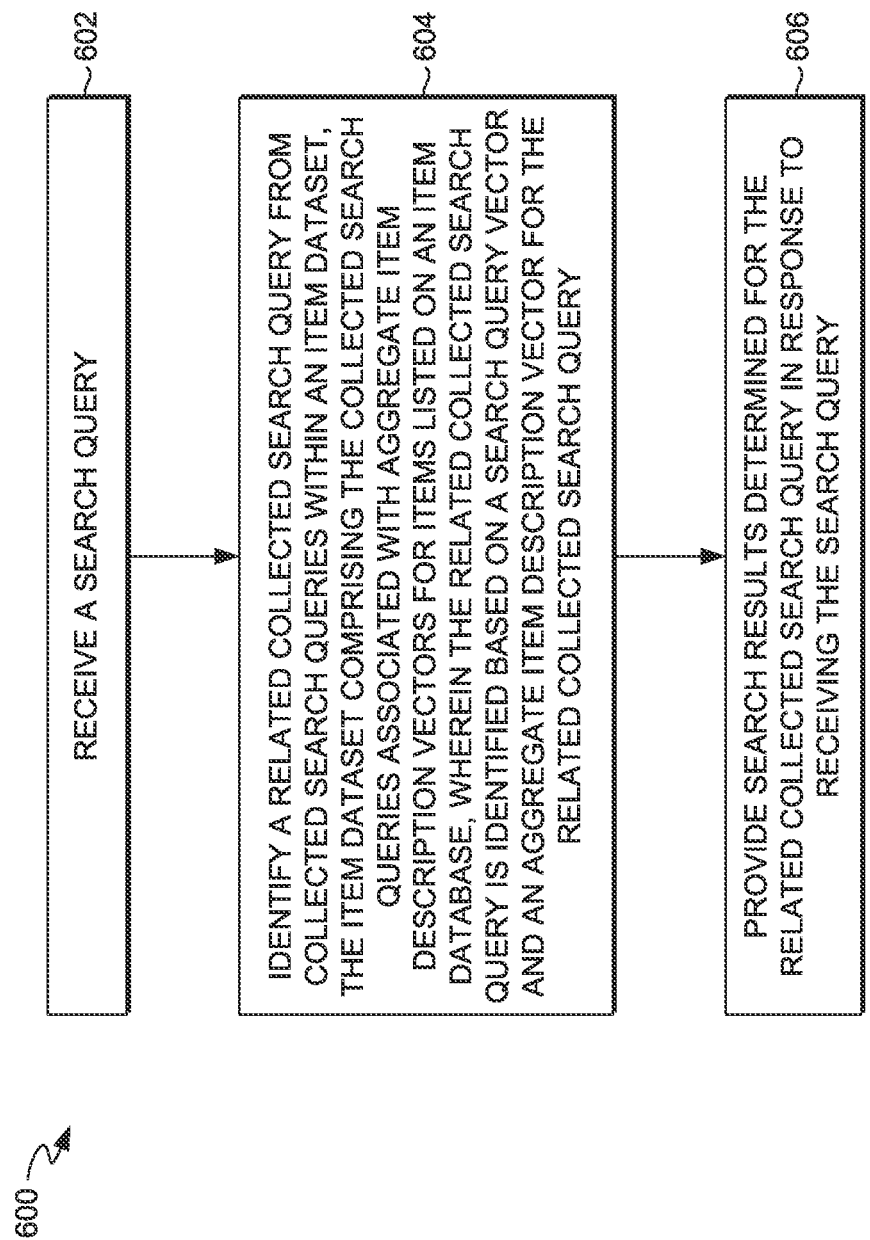
Figure 7:
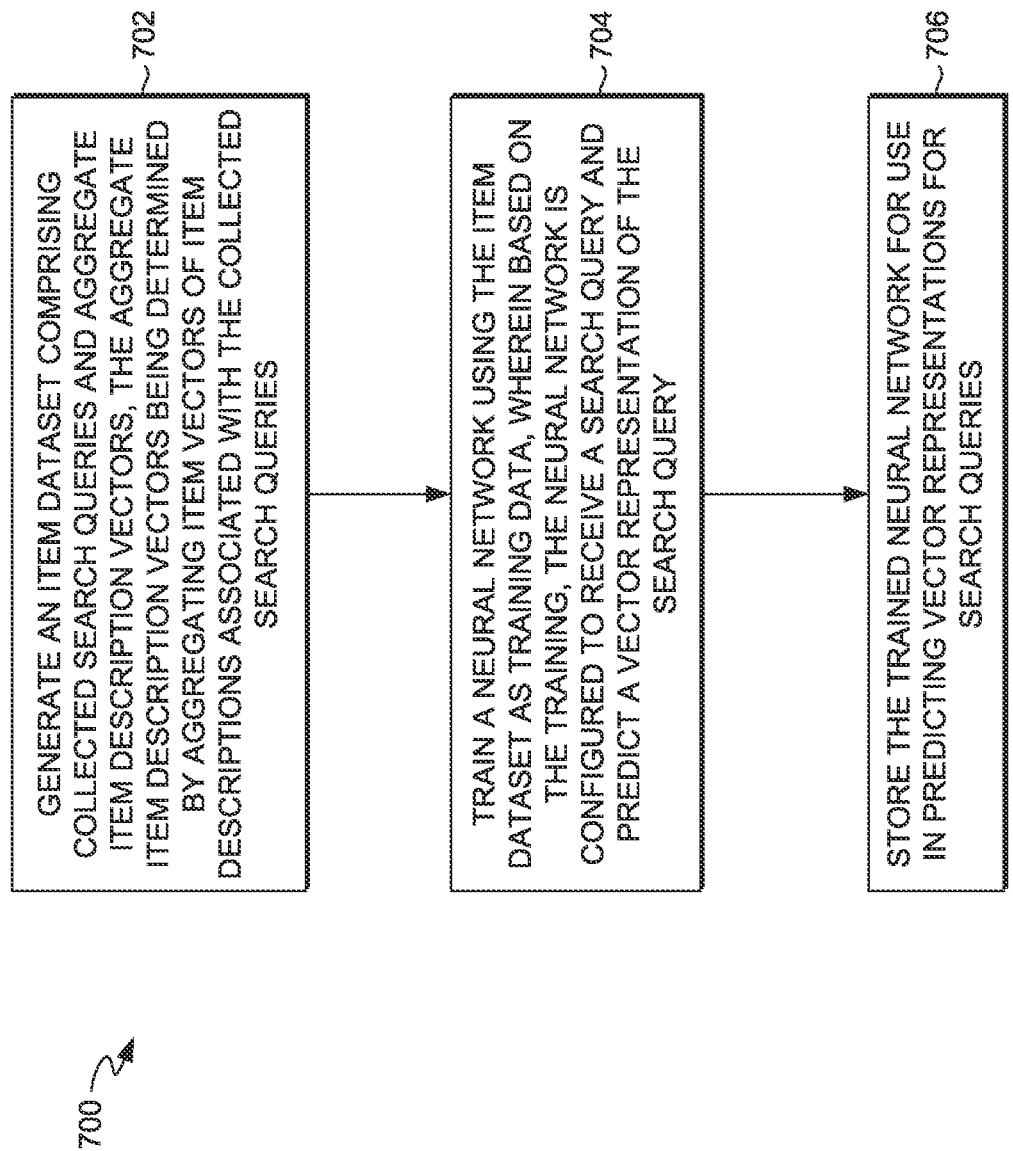

With reference to FIGS. 5-7, block diagrams are provided to illustrate methods for returning search results using aggregate item description vectors. The methods may be performed using search query engine 110 of FIG. 1 and related components. In embodiments, one or more computer storage media having computer-executable instructions embodied thereon that, when executed, by one or more processors, cause the one or more processors to perform the methods for providing search results.

Initially referring to FIG. 5, an example method 500 for returning search results is provided. At block 502, collected search queries are mapped to search results, which can comprise item descriptions, for the collected search queries. This can be performed by mapper 116 of FIG. 1. That is, when a search query is received, search results are provided in response. A subset of the search results can be mapped to a search query based on interaction tracking. For instance, interactions can be tracked after the search results are provided, and those search results with which users have interacted can be mapped to the search query. The search queries can be mapped by storing the search queries as collected search queries in a database in association with the search results having received interactions from users. In some cases, a highest number of top ranked search results based on the interaction tracking can be mapped to the collected search queries. For instance, the top number can be any predetermined number. Some examples include 5, 10, 25, 50, and 100. In an example, the number of top ranked search results mapped to collected search queries is equal to or less than 100 search results.

At block 504, item vectors are determined for the item descriptions of the search results. This can be performed by vector generator 118 of FIG. 1. For instance, the search results for which item vectors are determined can be the search results having been mapped at block 502. Item vectors can be determined for those search results with which users have interacted. The item vector determined for the search results can be respectively stored in association with the search queries associated with the search queries for which the item vectors are determined.

At block 506, the item vectors determined at block 504 are aggregated. This may be performed by item vector aggregator 120 of FIG. 1. For instance, each of the item vectors associated with a search query can be aggregated to form an aggregate item vector, and the aggregate item vector can be stored in association with the search query. As described, item vectors can be aggregated by averaging the item vectors.

In some cases, a weighted average can be used, and the weights can be based on the interaction tracking. That is, item vectors of item descriptions of search results having a relatively higher number of interactions can have a relatively greater weight when performing a weighted average. The weight applied for the weighted average can correspond to a proportional representation of the interactions relative to other search results having received interactions from users. An item dataset can be populated with the collected search queries and their associated aggregate item vectors determined at block 506, such that each search query is associated with one aggregate item description vector.

At block 508, a set of search results is determined for a search query. This can be performed by related search query identifier 122 and search result identifier 124 of FIG. 1. The search query can be received from a client computing device, such as client computing device 104. In response to the received search query, related search query identifier 122 can determine a related collected search query from among a dataset of collected search queries by comparing a search query vector to aggregate item description vectors associated with the collected search queries.

In an aspect, the related collected search query is determined by matching the received search query to a collected search query stored in the item dataset. The aggregate item description vector for the matching collected search query can then be used as the search query vector. The search query vector can be compared to other aggregate item description vectors. Based on a distance between the search query vector and another aggregate item description vector, the collected search query associated with the another aggregate item description vector is identified as related.

To determine the related search query based on the distance, a clustering analysis can be performed on the item dataset to determine aggregate item description vectors clusters. Collected search queries can be identified as related where the associated aggregate item description vectors for the collected search queries are included in a same aggregate item description vector cluster as the search query vector. Using another method, a nearest neighbor can be identified using a nearest neighbor algorithm, and one or more collected search queries associated with aggregate item description vectors having been identified as nearest neighbors can be identified as related collected search queries. In any event, a classifier determined by a classifier engine, such as classifier engine 114 can be used to further identify the related collected search queries.

One or more collected search queries identified as related collected search queries can be provided to the client computing device as search query recommendations for the search query. In some cases, in response to receiving the search query, search results associated with the related collected search queries, such as those having received interactions from users, can be provided. In another example, a selection of the recommended search queries is received, and the search results associated with the selected related collected search query are provided.

In some cases, the search query vector can be predicted. This may be performed by vector prediction engine 112 of FIG. 1. Prediction of the search query vector from the search query may be performed in response to determining there is no matching collected search query. The predicted vector may be predicted based on the search query and further predicted based on a predicted classification for the search query. In a particular case, to predict the search query vector, the collected search queries and the aggregate item description vectors can be used as training data to train a neural network. The received search query can be input to the trained neural network to predict the search query vector.

Referring now to FIG. 6, an example method 600 for returning search results is provided. At block 602, a search query is received. This may be received from client computing device 104, for example.

At block 604, a related collected search query is identified. This can be performed by related search query identifier 122 of FIG. 1. The related search query can be identified from among collected search queries stored in an item dataset. In one instance, the aggregate item description vectors associated with the collected search queries of the item dataset are compared to a search query vector associated with the search query to identify a related collected search query. The search query vector can be identified by matching the search query to a collected search query associated with an aggregate item description vector, or can be predicted using a trained neural network, which can be done using vector prediction engine 112 of FIG. 1. A classifier engine, such as classifier engine 114, can be employed to determine a classification for the received search query, which can be further used to identify related collected search queries.

The related collected search query can be identified using a clustering method, for instance, by identifying one or more collected search queries as related based on the aggregate item description vectors of the one or more collected search queries being included within a same aggregate item descriptive vector cluster as the search query vector. In some cases, the related collected search queries can be identified using a nearest neighbor algorithm to identify aggregate item description vectors that are nearest neighbors to the search query vector.

Referring now to FIG. 7, an example method 700 for returning search results is provided. At block 702, an item dataset is generated. This can be performed using search query engine 110 of FIG. 1. The item dataset can comprise collected search queries and aggregate item description vectors of item descriptions of the collected search queries. For instance, search queries are received, and search results are provided in response. Interaction tracking can be used to identify search results with which users interact. Item vectors can be determined for search results having received interactions, and the item vectors can be aggregated to generate an aggregate item description vector for each search query. The search queries are stored in the item dataset as collected search queries in respective association with the aggregate item description vectors. In some cases, a classification associated with each of the collected search queries can also be stored in the item dataset. The classification can be determined, for instance, by classifier engine 114.

At block 704, a neural network is trained. The neural network can be trained using vector prediction engine 112 of FIG. 1. To train the neural network, the item dataset determined at step 702 can be provided as training data. As a result of the training, the trained neural network is configured to receive a search query and predict a vector representation of the search query. In cases where a classification is also used as training data, the trained neural network is configured to predict the vector representation of the search query based further on a classification of the search query.

At block 706, the trained neural network is stored. The trained neural network can be employed for use in predicting vector representations of search queries. Upon predicting a search query vector, the search query vector can be used to identify a related collected search query, for instance, from the item dataset, based on comparing the predicted search query to the aggregate item description vectors of the item dataset. Search results can be returned for the search query, where the search results include search results associated with identified related collected search queries.

Figure 8:
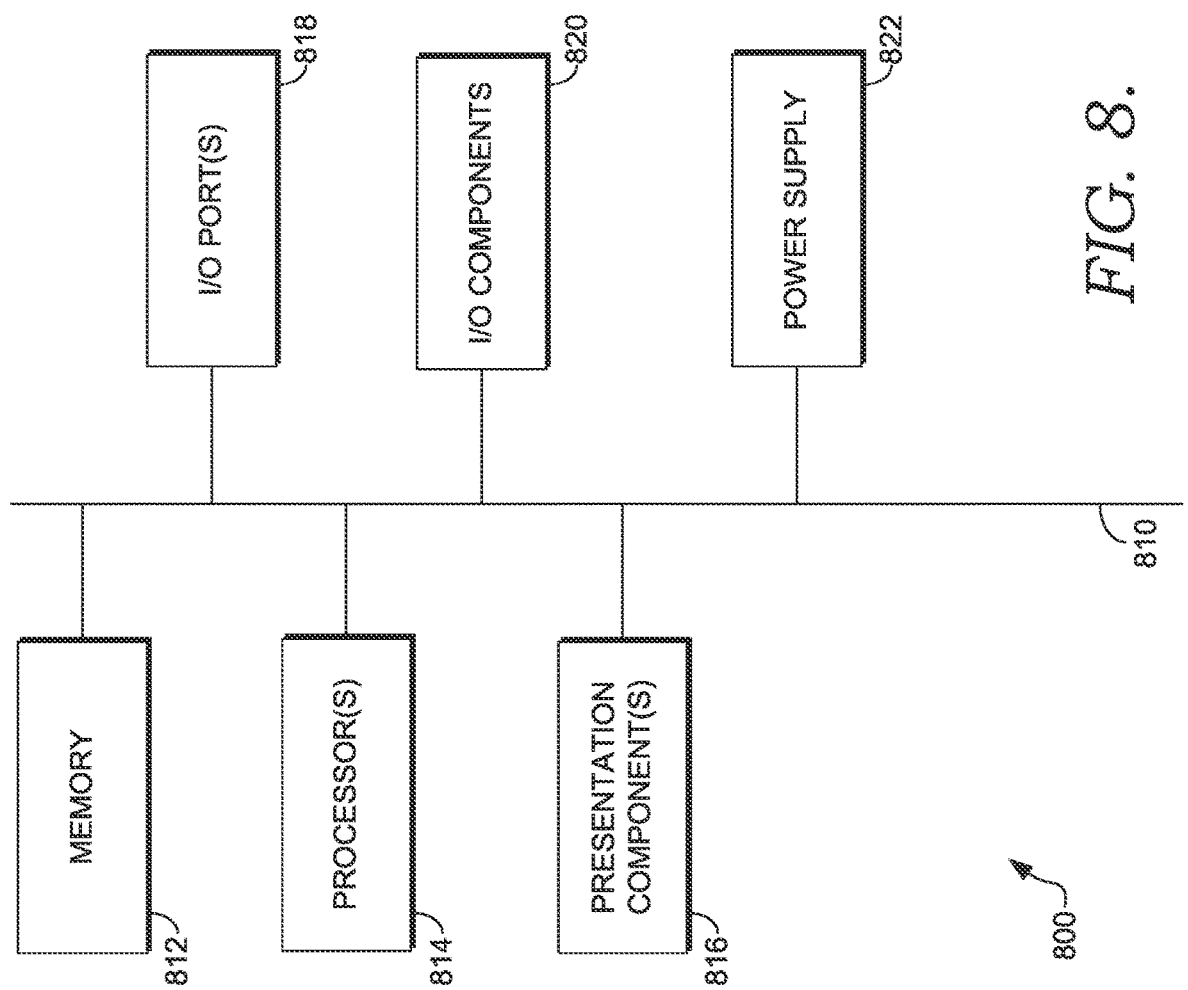
FIG. 8 is an example computing device suitable for implementing the described technology, in accordance with an embodiment described herein.

Having described an overview of embodiments of the present technology, an example operating environment in which embodiments of the present technology may be implemented is described below in order to provide a general context for various aspects. Referring initially to FIG. 8, in particular, an example operating environment for implementing embodiments of the present technology is shown and designated generally as computing device 800. Computing device 800 is but one example of a suitable computing environment and is not intended to suggest any limitation as to the scope of use or functionality of the technology. Neither should computing device 800 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 8 merely illustrates an example computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Examples of presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media. Also, the word "initiating" has the same broad meaning as the word "executing or "instructing" where the corresponding action can be performed to completion or interrupted based on an occurrence of another action.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to returning search results, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A computerized method for returning search results performed by one or more processors, the method comprising:
    mapping collected search queries to a subset of search results determined based on interaction tracking of the collected search queries, wherein search results comprise item descriptions;
    determining item vectors for the item descriptions of the subset of search results;
    aggregating the item vectors of the item descriptions of the subset of search results to determine an aggregate item description vector for each collected search query, wherein the aggregating averages the item vectors using a weighted averaged determined from the interaction tracking;
    matching a search query to a collected search query associated with an aggregate item vector; and
    executing a search for the search query using the aggregate item vector of the matching collected search query to identify a set of search results for the search query.

2. The method of claim 1, further comprising:
    populating an item dataset with the collected search queries and the aggregate item description vector for each of the collected search queries.

3. The method of claim 1, further comprising:
    identifying a plurality of related collected search queries, the plurality of related collected search queries identified based on a cosine similarity between aggregate item description vectors for the plurality of related collected search queries and the aggregate item description vector for the matching collected search query; and
    providing the plurality of related collected search queries as search query recommendations in response to receiving the search query.

4. The method of claim 1, further comprising:
    training a neural network on training data comprising the collected search queries and the aggregate item description vector for each of the collected search queries.

5. The method of claim 1, wherein the aggregate item description vectors are determined from a selected number of top ranked search results mapped to the collected search queries.

6. The method of claim 1, further comprising determining a proportional number of interactions received by each search result of the subset of search results, wherein the weighted average of the item vectors is determined according to the proportional number of interactions.

7. One or more computer storage media storing computer-readable instructions that when executed by a processor, cause the processor to perform operations for returning search results, the operations comprising:

receiving a search query;

determining a search query vector;

identifying a related collected search query from collected search queries within an item dataset, the item dataset comprising the collected search queries associated with aggregate item description vectors for items listed on an item database, the aggregate item description vectors determined using a weighted average of item vectors for search results of the collected search queries, the weighted average based on interaction tracking of the search results, wherein the related collected search query is identified based on the search query vector and an aggregate item description vector for the related collected search query; and executing a search using the related collected search query to identify search results for the search query.

8. The media of claim 7, further comprising performing a clustering analysis on the item dataset to determine aggregate item description vector clusters, wherein the related collected search query is identified based on the search query vector and the aggregate item description vector being included within a same aggregate item description vector cluster.

9. The media of claim 7, wherein the item dataset is a nearest neighbor database, and the related collected search query is identified based on the aggregate item description vector for the related collected search query being a nearest neighbor relative to the search query vector.

10. The media of claim 7, wherein the item dataset is a nearest neighbor database, and the related collected search query is identified based on the aggregate item description vector for the related collected search query being within a distance threshold value, the distance threshold value determined based on a variance for an aggregate item description vector of a collected search query that matches the search query.

11. The media of claim 7, further comprising employing a trained classifier to predict a classification for the search query, wherein the related collected search query is further identified based on the predicted classification.

12. A system returning search results, the system comprising:

at least one processor; and one or more computer storage media storing computer-readable instructions thereon that when executed by the at least one processor, cause the at least one processor to:

generate an item dataset comprising collected search queries, classifications of the collected search queries, and aggregate item description vectors, the aggregate item description vectors being determined by aggregating item vectors of item descriptions associated with the collected search queries, the item vectors aggregated using a weighted average, wherein weights associated with the weighted average are determined from interaction tracking of the search results for the collected search queries corresponding to the item vectors being aggregated;

train a neural network using the item dataset as training data, wherein based on the training, the neural network is configured to receive a search query and predicted classification for the search query and to predict a vector representation of the search query; and store the trained neural network for use in predicting vector representations for search queries.

13. The system of claim 12, wherein the aggregate item description vectors are determined by averaging the item vectors for items provided as search results for the collected search queries.

14. The system of claim 12, further comprising employing a trained classifier to predict the classifications for each of the collected search queries.

15. The system of claim 12, further comprising:

employing the neural network to predict a search query vector for a received search query;

identify a related collected search query from the collected search queries of the item dataset based on the search query vector and an aggregate item description vector for the related collected search query; and return search results associated with the related collected search query in response to receiving the search query.

* * * * *